United States Patent
Park et al.

(10) Patent No.: US 11,609,330 B2
(45) Date of Patent: Mar. 21, 2023

(54) SILICON-OPA-BASED LIDAR FOR MEASURING DISTANCE USING QUASI-FREQUENCY MODULATION

(71) Applicant: KOREA ADVANCED INSTITUTE OF SCIENCE AND TECHNOLOGY, Daejeon (KR)

(72) Inventors: Hyo-Hoon Park, Daejeon (KR); Hyeonho Yoon, Daejeon (KR); Nam-Hyun Kwon, Daejeon (KR); Kyeongjin Han, Daejeon (KR); Hyun-Woo Rhee, Daejeon (KR); Geum-Bong Kang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 362 days.

(21) Appl. No.: 16/839,277

(22) Filed: Apr. 3, 2020

(65) Prior Publication Data
US 2021/0302577 A1 Sep. 30, 2021

(30) Foreign Application Priority Data

Mar. 30, 2020 (KR) .......................... 10-2020-0038027

(51) Int. Cl.
*G01S 7/481* (2006.01)
*G01S 17/32* (2020.01)
*G01S 7/4913* (2020.01)

(52) U.S. Cl.
CPC ............. *G01S 17/32* (2013.01); *G01S 7/4811* (2013.01); *G01S 7/4816* (2013.01); *G01S 7/4913* (2013.01)

(58) Field of Classification Search
CPC ...... G01S 17/32; G01S 7/4811; G01S 7/4816; G01S 7/4913; G01S 7/4814;

(Continued)

(56) References Cited

U.S. PATENT DOCUMENTS

2020/0309952 A1* 10/2020 Imaki .................... G01S 7/4911

FOREIGN PATENT DOCUMENTS

| JP | 2019211239 A | 12/2019 |
| KR | 10-1160435 B1 | 6/2012 |
| KR | 10-20190099329 A | 8/2019 |

OTHER PUBLICATIONS

Kim et al., "Thermo-optic control of the longitudinal radiation angle in a silicon-based optical phased array," Optics Letters 44(2): 411-414 (2019).

(Continued)

*Primary Examiner* — Thanh Y. Tran
(74) *Attorney, Agent, or Firm* — Hoffman Warnick LLC

(57) ABSTRACT

A silicon phased array based LiDAR device that measures a distance using a quasi-frequency modulation is disclosed. A LiDAR device according to an exemplary embodiment of the inventive concept includes a light source that generates an optical signal, an optical modulator that generates a first optical signal having a quasi-frequency whose a modulation frequency constantly varies with time by modulating a light intensity of the optical signal, an optical splitter that splits optical power of the first optical signal into a reference optical signal and a transmit (Tx) optical signal, an optical transmitter that receives and emits the Tx optical signal toward an object, an optical receiver that receives a receive (Rx) optical signal reflected from the object and transfers the Rx optical signal, an optical coupler that mixes the reference optical signal and the Rx optical signal, a balanced photodetector that detects an intermediate frequency from the optical signal transferred from the optical coupler and a distance calculator that obtains distance information by measuring the intermediate frequency.

10 Claims, 4 Drawing Sheets

(58) Field of Classification Search
CPC ....... G01S 7/4911; G01S 7/4914; G02B 6/26; H01L 31/02024; H01L 31/02162; H01L 2223/6688; H01L 2223/6694
See application file for complete search history.

(56) References Cited

OTHER PUBLICATIONS

Heaton et al., "General Matrix Theory of Self-Imaging in Multimode Interference (MMI) Couplers," IEEE Photonics Technology Letters 11(2): 212-214 (1999).
You et al., "Photon-assisted tunneling for a sub-bandgap light detection in silicon PN-dopted waveguides," Optics Express 25(4): 4284-4296 (2017).

* cited by examiner

SILICON-OPA-BASED LIDAR FOR MEASURING DISTANCE USING QUASI-FREQUENCY MODULATION

CROSS-REFERENCE TO RELATED APPLICATIONS

A claim for priority under 35 U.S.C. § 119 is made to Korean Patent Application No. 10-2020-0038027 filed on 30 March, 2020, in the Korean Intellectual Property Office, the entire contents of which are hereby incorporated by reference.

BACKGROUND

The inventive concept relates to a light detection and ranging (LiDAR) device for obtaining distance information to an object using an optical signal, and more particularly, a method of measuring distance information using quasi-frequency modulation based on a silicon optical phased array and a LiDAR device employing the method.

LiDAR employs a technique for measuring a distance using a signal reflected by emitting a beam that is an optical signal toward an object, and has a function of generating a beam, steering a beam, and receiving a beam. A conventional LiDAR had used a mechanical rotating part including a mirror and a motor as a beam steering means, but recently, has been employed a silicon-based optical phased array that steers a beam without such mechanical rotation.

The silicon optical phased array, which is an optical integrated element that steers a beam by using the interference effect between radiated optical signals, has excellent durability because there is no mechanical driving part and is manufactured as a semiconductor ship, thus enabling a solid state LiDAR capable of achieving ultra-small size, high reliability, and mass production.

The optical phased array implemented with the silicon optical integrated element produces a beam using optical interference between optical waves transmitted from a plurality of radiators, and steers the beam by controlling the phase of the light emitted from each radiator. By using silicon semiconductor technology, it has advantages in terms of ultra-small size, high reliability, and mass production. However, a silicon optical integrated element including such a silicon optical phased array has a disadvantage in that the transmit optical power is low due to the waveguide loss and coupling loss in the element and optical loss due to external optical connection.

As a distance measurement means for a LiDAR including a silicon optical phased array, a conventional time of flight (TOF) and frequency modulation continuous wave (FMCW) may be employed. Considering the low optical power mentioned above, it is advantageous to employ an FMCW having a longer sensing distance compared to TOF. The FMCW disclosed in Korean Patent Registration No. 10-1877388 is a method of measuring a distance by detecting a beating frequency, that is, an intermediate frequency by beating of a reflected light and a reference light (local light source). In this case, the optical power at the beating frequency is amplified by the reference optical power due to a beating effect. Therefore, it is possible to widen the sensing distance even at low reception power, which is a suitable method for the LiDAR using the silicon optical integrated element.

However, a method of directly changing an oscillation frequency of the light source, such as the conventional FMCW method, requires a complicated additional function for controlling a sensitive oscillation element, and thus needs to be improved to realize a compact and low power LiDAR using a silicon integrated circuit. For example, precise and fine frequency changes should be made while maintaining thermal stability in an extremely small range ($1/100{,}000$ or less) of 1 GHz level at a carrier frequency of 200 THz. This causes a problem of increasing the scale and complexity of a system because a high level of temperature stabilization device, a wavelength stabilization device, and a high-precision wavelength variable device and the like are required.

SUMMARY

Exemplary embodiments of the inventive concept provide a method of measuring distance information using quasi-frequency modulation which is resulted by improving the FMCW method based on a silicon optical phased array and a LiDAR device employing the same.

Exemplary embodiments of the inventive concept provide a LiDAR device that generates an amplified electrical signal having an intermediate frequency by mixing an optical signal received by being reflected by an object with a coherent reference optical signal having large power and performing beating and measures a distance to an object based on the generated electrical signal.

According to an exemplary embodiment, a LiDAR device includes a light source that generates an optical signal, an optical modulator that generates a first optical signal having a quasi-frequency whose a modulation frequency constantly varies with time by modulating a light intensity of the optical signal, an optical splitter that splits optical power of the first optical signal into a reference optical signal and a transmit (Tx) optical signal, an optical transmitter that receives and emits the Tx optical signal toward an object, an optical receiver that receives a receive (Rx) optical signal reflected from the object and transfers the Rx optical signal, an optical coupler that mixes the reference optical signal and the Rx optical signal, a balanced photodetector that detects an intermediate frequency from the optical signal transferred from the optical coupler and a distance calculator that obtains distance information by measuring the intermediate frequency.

The optical transmitter and the optical receiver may be an optical transmitter and an optical receiver which are based on an optical phased array.

The optical modulator may have a Y-branch structure and include a mach zehnder interferometer (MZI) based structure having a phase shifter of a silicon p-n junction structure on the branch.

The optical splitter includes a multimode interference optical splitter having a predetermined splitting ratio, which forms a multimode interference pattern according to a self-imaging theory by coupling the first optical signal, which has been transferred through a single mode optical waveguide, to a multimode optical waveguide and placing an output waveguide in a region in which the multimode interference pattern is generated.

The optical transmitter may include a means capable of emitting the Tx optical signal transferred onto an optical waveguide to free space through a plurality of optical radiators and simultaneously adjusting an emission direction by adjusting a phase difference of a beam emitted from each optical radiator.

The optical transmitter may include N arrays arranged in one of a lattice structure, a mirror structure, or a metal thin film structure.

The optical transmitter may include optical reception arrays made of N arrays, and the optical reception arrays may receive an optical signal received in a direction corresponding to a specific phase difference by applying the specific phase difference to an optical signal received in each channel through a phase shifter provided from each channel.

The optical receiver may include N arrays arranged in one of a lattice structure, a mirror structure, or a metal thin film structure.

The optical coupler may include an optical coupler in which the reference optical signal and the Rx optical signal inputted to two waveguides are mixed, subjected to phase shift, and transferred to an output port.

The balanced photodetector may be implemented as a silicon photon assisted tunneling photodetector (Si PAT-PD) in form of an optical waveguide photodetector that obtains a photocurrent using a photon assisted tunneling effect by a reverse bias voltage applied to a p-n junction structure of a silicon waveguide.

The optical modulator, the optical splitter, the optical transmitter, the optical receiver, the optical coupler and the balanced photodetector may be integrated in a single silicon optical chip.

According to an exemplary embodiment, a silicon optical integrated element-based LiDAR device for measuring a distance by using a quasi-frequency modulated by an optical modulator included in a silicon optical integrated element without modulating a oscillation frequency of a light source, includes a light source located outside the silicon optical integrated element to generate a continuous coherent optical signal at a constant oscillation frequency, the silicon optical integrated element that generates a first optical signal having a quasi-frequency by modulating a light intensity of the optical signal generated by the light source, mixing an optical signal, reflected by emitting the first optical signal toward an object, with a preset reference optical signal, and detect an intermediate frequency from the mixed optical signal, and a distance calculator that obtains distance information by measuring the intermediate frequency.

According to an exemplary embodiment, a distance measurement method of a LiDAR device includes generating an optical signal using a light source, generating a first optical signal having a quasi-frequency whose a modulation frequency constantly varies with time by modulating a light intensity of the optical signal, splitting optical power of the first optical signal into a reference optical signal and a transmit (Tx) optical signal, radiating the Tx optical signal toward an object, receiving a receive (Rx) optical signal that is an optical signal reflected from the object, and mixing the reference optical signal and the Rx optical signal, detecting an intermediate frequency from the mixed optical signal, and obtaining distance information by measuring the intermediate frequency.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
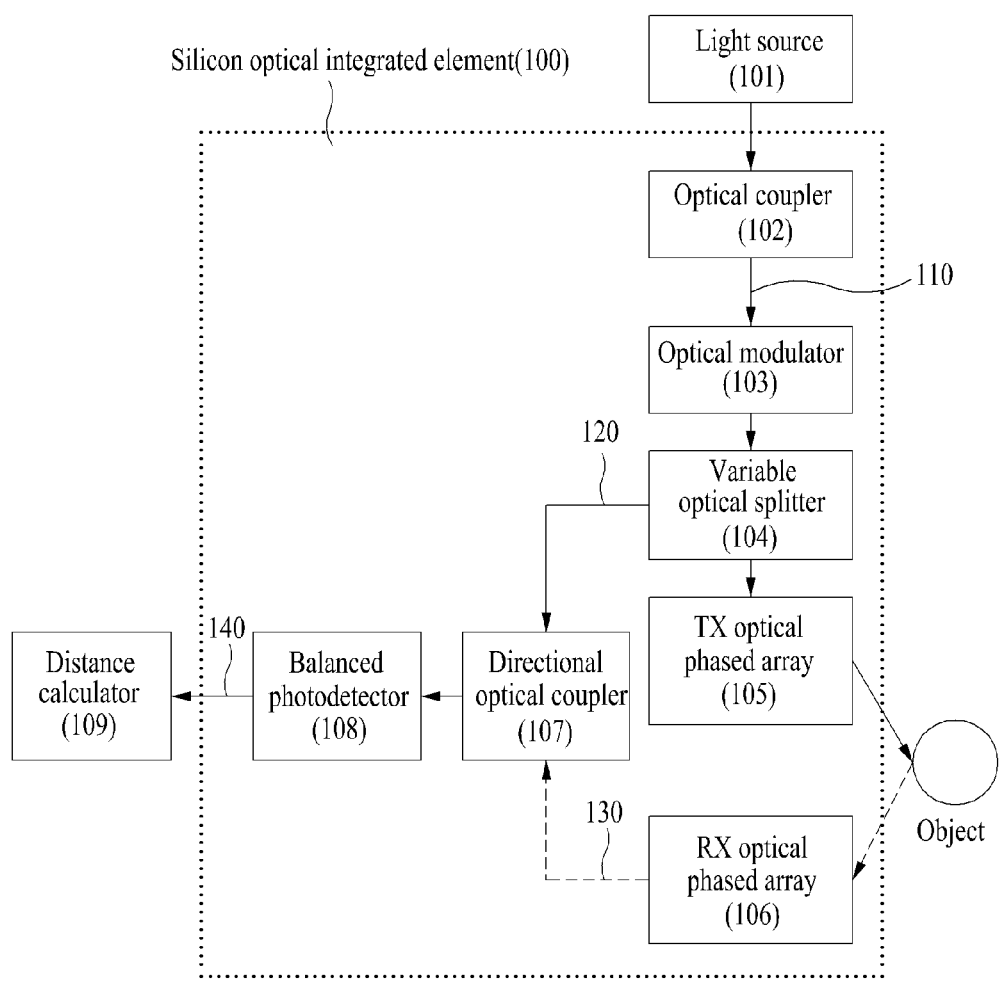
FIG. 1 shows a configuration for a silicon phased array-based LiDAR device according to an exemplary embodiment of the inventive concept.

Advantages and features of the inventive concept and methods for achieving them will be apparent with reference to exemplary embodiments described below in detail in conjunction with the accompanying drawings. However, the present invention is not limited to the embodiments disclosed below, but can be implemented in various forms, and these embodiments are to make the disclosure of the present invention complete, and are provided so that this disclosure will be thorough and complete and will fully convey the scope of the invention to those of ordinary skill in the art, which is to be defined only by the scope of the claims.

The terminology used herein is for the purpose of describing exemplary embodiments only and is not intended to be limiting of the inventive concept. The singular expressions include plural expressions unless the context clearly dictates otherwise. In this specification, the terms "comprises" and/or "comprising" are intended to specify the presence of stated features, integers, steps, operations, elements, parts or combinations thereof, But do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred exemplary embodiments of the present invention will be described in detail with reference to the accompanying drawings. The same reference numerals are used for the same components in the drawings, and duplicate descriptions of the same components are omitted.

Exemplary embodiments of the inventive concept is to provide a LiDAR device capable of measuring distance information using quasi-frequency modulation by improving the FMCW method based on a silicon optical phased array, which generates an amplified electrical signal having a beat frequency (or intermediate frequency) by mixing an Rx optical signal received by being reflected by an object with a coherent reference optical signal having large power and performing beating and measures a distance to an object based on the generated electrical signal.

In this case, the LiDAR device is a silicon optical integrated element based LiDAR that measures a distance using a quasi-frequency modulated using an optical modulator included in a silicon optical integrated element without modulating a oscillation frequency of a light source, and may include a light source located outside the silicon optical integrated element to generate a continuous coherent optical signal at a constant oscillation frequency, a silicon optical integrated element employing the optical heterodyne detection method of generating an optical signal having a quasi-frequency by modulating a light intensity of the optical signal generated by the light source, emitting the optical signal toward an object through an optical antenna included in the silicon optical integrated element, receiving a reflected optical signal, mixing the optical signal and a reference optical signal, performing down conversion into an intermediate frequency on the mixed optical signal, and outputting an electrical signal with a conversion gain, and a distance calculator that obtains distance information by measuring the intermediate frequency.

FIG. 1 shows a configuration for a silicon phased array-based LiDAR device according to an exemplary embodiment of the inventive concept.

Referring to FIG. 1, a LiDAR device according to an exemplary embodiment of the inventive concept may be a LiDAR device that measures a distance to a surrounding object, which generates an optical signal of which a quasi-frequency varies over time in an external optical modulator 103 that is separate from a light source 101 and obtains distance information through a silicon transmission optical phased array 105 and a silicon reception optical phased array 106.

The light source 101 which is located in front of the optical modulator 103 to supply an optical signal may be a laser that maintains a single oscillation frequency which oscillates a laser having a wavelength of 1550 nm or 1310 nm, for example, and supply the laser to the optical modulator 103.

When the light source 101 is located outside a silicon integrated optical element 100, an optical coupler 102 may be required, which is able to couple the light source 101 such that an optical signal generated by the light source 101 travels to the silicon integrated optical element 100. Various ways such as a cross-sectional bonding method or a surface-bonding method may be applied to the optical coupler 102. The optical coupler 102 may also use an inverse taper or a fiber block array using various materials.

The optical modulator 103 may modulate a light intensity of the optical signal to generate an optical signal having a quasi-frequency of which a modulation frequency is constantly changed over time. The quasi-frequency which continuously varies over time may be an essential element for measuring a distance by detecting an intermediate frequency proportional to the distance of an object.

In general, the FMCW method may require a very complex system to obtain a continuously variable frequency over time. Unlike the above-described quasi-frequency modulation, a conventional LiDAR to which FMCW is applied may use a method of directly modulating an oscillation frequency by adjusting a refractive index or a filter of a resonator of a laser included therein. However, the resonator for amplifying the optical signal in the laser may include an optical amplifying element that is very sensitive to an operating environment, a filter and the like. In the case of changing a frequency by changing the refractive index using a temperature or a voltage, a temperature stabilization device for stabilizing the temperature separately or a wavelength stabilization device and a wavelength tunable device for precise wavelength control using a loopback signal through frequency monitoring may be required.

The LiDAR device of the disclosure may use the optical modulator 103, which is simple in structure, is less sensitive to an operating environment including heat, and is advantageous for generating a continuously variable quasi-frequency, unlike a method of directly modulating a complex laser. The optical modulator 103 may have a Y-branch structure and include a Mach zehnder interferometer (MZI) based optical modulator having a phase shifter of a silicon p-n junction structure on the branch.

The quasi-frequency optical signal generated by the silicon-based optical modulator 103 may be transferred to an optical splitter 104 located at a rear end, through a silicon optical waveguide.

The optical splitter 104 may split the transferred optical signal to provide a transmit (Tx) optical signal to a Tx optical phased array 105 located at one rear end and a reference optical signal to an optical coupler 107 located at another rear end. The ratio of the split optical signals may be determined according to a design.

The optical splitter 104 may include a multimode interference (MMI) optical splitter which forms a multimode interference pattern by the self-imaging theory by combining an optical signal transferred to a single-mode optical waveguide to a multimode waveguide, and has an arbitrary branch rate or a predetermined branch rate by arranging the output waveguide in an area where a multi-mode interference pattern occurs.

The TX optical phased array 105 may be located at the rear end of the optical splitter 104 to irradiate the transferred TX optical signal moved to an object in free space.

Figure 3:
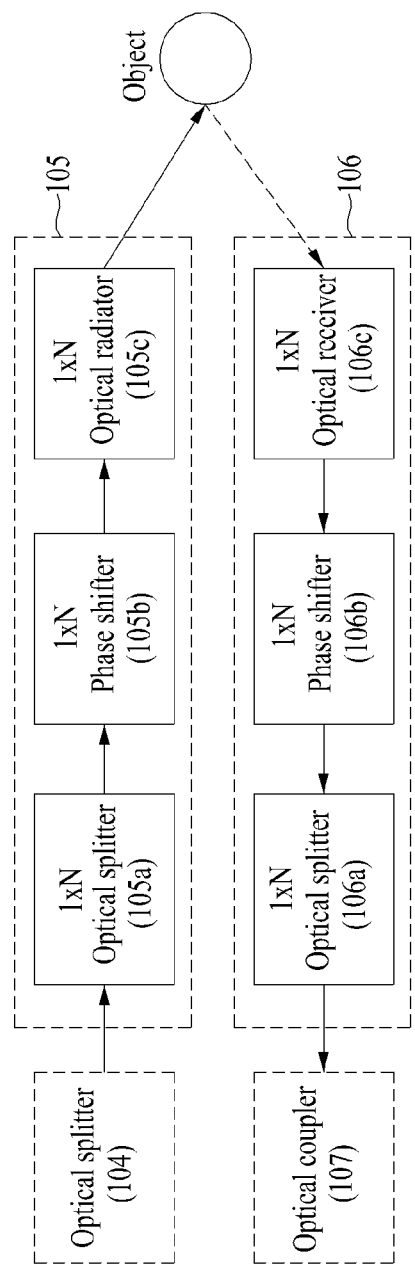
FIG. 3 shows an exemplary diagram for a transmit optical phased array and a receive optical phased array shown in FIG. 1.

The TX optical phased array 105 may, as shown in FIG. 3, include a 1×N optical splitter 105a, a 1×N phase shifter 105b, and a 1×N optical radiator 105c to emit the TX optical signal to free space. The 1×N optical splitter 105a may split the transferred TX optical signal into N optical channels, and the 1×N phase shifter 105b located at the rear end may adjust a phase of each channel and again emit an optical signal to free space through the 1×N optical radiator 105c located at the rear end.

The 1×N optical splitter 105a may include an MMI optical splitter, a Y-branch, a directional coupler, or a star coupler and be included in a silicon integrated optical element. The 1×N phase shifter 105b may control a phase in an electro-optic method (p-i-n structure or p-n structure) or a thermo-optic (p-i-n structure or metal heater structure) method.

The optical radiator 105c may be formed in any one of a lattice structure, a mirror structure, and a metal thin film structure. The Tx optical phased array 105 may include a means capable of radiating the optical signal transferred through an optical waveguide to free space through a plurality of optical radiators and simultaneously adjusting an emission direction by adjusting a phase difference of an beam radiated from each optical radiator. Therefore, the application of the Tx optical phased array 105 may remove a mechanical rotating part and an optical system required for steering an optical signal in a conventional LiDAR structure, thereby making it possible to dramatically improve durability and efficiency.

The optical signal emitted from the Tx optical phased array 105 and then reflected by an object may be received by an Rx optical phased array 106 and transferred to the optical coupler 107 located at the rear end.

The Rx optical phased array 106 may include a means capable of receiving only the optical signal transferred in a desired direction without a mechanical rotating part or an optical device for selecting an optical signal in a specific direction in the conventional LiDAR. The Rx optical phased array 106, which includes a 1×N optical receiver 106c having the same structure as the optical radiator of the Tx optical phased array 105 and is composed of N arrays, allows only optical signals received in a direction corresponding to a specific phase difference to be transferred to the optical coupler 107 at the rear end through the 1×N optical splitter 106a by applying the specific phase difference to an optical signal received in each cannel through the 1×N phase shifter 106b provided for each channel Therefore, the application of the Rx optical phased array 106 may remove the mechanical rotating part and the optical system necessary to select a received signal in the conventional LiDAR structure to improve durability and efficiency and suppress noise to improve a signal to noise ratio.

The 1×N optical splitter 106a, the 1×N phase shifter 106b and the 1×N optical receiver 106c included in the Rx optical phased array 106 may be configured in the same components as those the corresponding Tx optical phased arrays 105. Therefore, the Rx optical phased array 106 and the Tx optical phased array 105 may be implement as a Tx/Rx optical phased array that simultaneously performs transmission and reception.

The optical coupler 107 located at the rear ends of the Rx optical phased array 106 and the optical splitter 104 may receive the reference optical signal and the reflected optical signal, change phases, mix the two optical signals, and transfer an optical signal produced by mixing to an photodetector 108 located at the rear end thereof.

In a process of converting an optical signal to an electrical signal in the photodetector 108, the reference optical signal and the reflected optical signal may be mixed to obtain a conversion gain due to a beating phenomenon from two optical signals having different frequencies. Therefore, the optical coupler 107 may include a directional optical coupler in which two optical waveguides are disposed close to each other and signals input to the two waveguides are mixed, subjected to phase shift, and then transferred to an output port according to the coupled mode theory in which the evanescent mode of one optical signal guided overlap that of the other waveguide and optical power is transferred. The directional optical coupler 107 made of a silicon waveguide may be integrated in a silicon optical element together with the component module.

The basic function of the photodetector 108 may be an element that converts and detects an optical signal into an electrical signal. In the present invention, it is possible to construct a balanced light detector using a photon assisted tunneling-photodetector (PAT-PD), which is an optical waveguide type PD, is made of silicon material without using a heterojunction material such as Ge or III-V. Silicon inherently hardly absorbs light in the wavelength range of 1.1 um. Nevertheless, when a strong electric field is applied to a silicon waveguide having a p-n coupling structure, a photocurrent may be obtained by the photon assisted tunneling effect. That is, the photodetector 108 may be implemented with a Si PAT-PD in the form of an optical waveguide photodetector that obtains a photocurrent using a photon-assisted tunneling effect by a reverse bias voltage applied to a p-n junction structure of a silicon waveguide.

Typically, a conventional LiDAR may use a surface light receiving type APD (Avalanche photodiode) or SPD (single photon diode) because a reflected light is received through lens in the LiDAR, but in the Rx optical phased array used in the inventive concept, it may be advantageous to connect to an optical waveguide PD instead of the optical waveguide PD, which is difficult to connect, because the received optical signals are collected in a single waveguide.

The PAT-PD may be integrated in a silicon optical integrated element as a single element through a CMOS process without producing a heterojunction PD such as Ge or III-V. In addition, the silicon-based PAT-PD may be integrated in the element together with the optical coupler 107 composed of the directional optical coupler thereby efficiently generating an electrical signal with an intermediate frequency.

The electrical signal with the intermediate frequency generated by the photodetector 108 may be an electrical signal having a frequency magnitude proportional to the delay time to the Rx optical signal, and the electrical signal of the intermediate frequency may be transferred to a distance calculator 109.

The distance calculator 109 may be located at the rear end of the photodetector 108 and may measure the intermediate frequency to obtain distance information corresponding to a frequency magnitude thereof.

In the inventive concept, because the electric signal generated by the photo detector 108 may have a frequency proportional to the distance, a frequency digital converter that converts the frequency into digital information may be used.

Here, the balanced photodetector 108 or the distance calculator 109 may include a trans impedance amplifier (TIA) that converts an electrical signal having a beat frequency into a voltage signal and amplifies the voltage signal, a band pass filter that passes and outputs only an intermediate frequency band of the voltage signal having the beat frequency transferred from the trans impedance amplifier, and an envelope detector that detects an envelope from the voltage signal having the beat frequency output by passing through the band pass filter.

In the LiDAR device of the inventive concept, the optical modulator 103, the optical splitter 104, the optical transmitter 105, the optical receiver 106, the optical coupler 107 and the balanced photodetector 108 may be integrated into a single silicon optical chip.

The inventive concept may provide a silicon optical phased array based LiDAR device capable of measuring a distance by quasi-frequency modulation with the above-described configuration.

Figure 2:
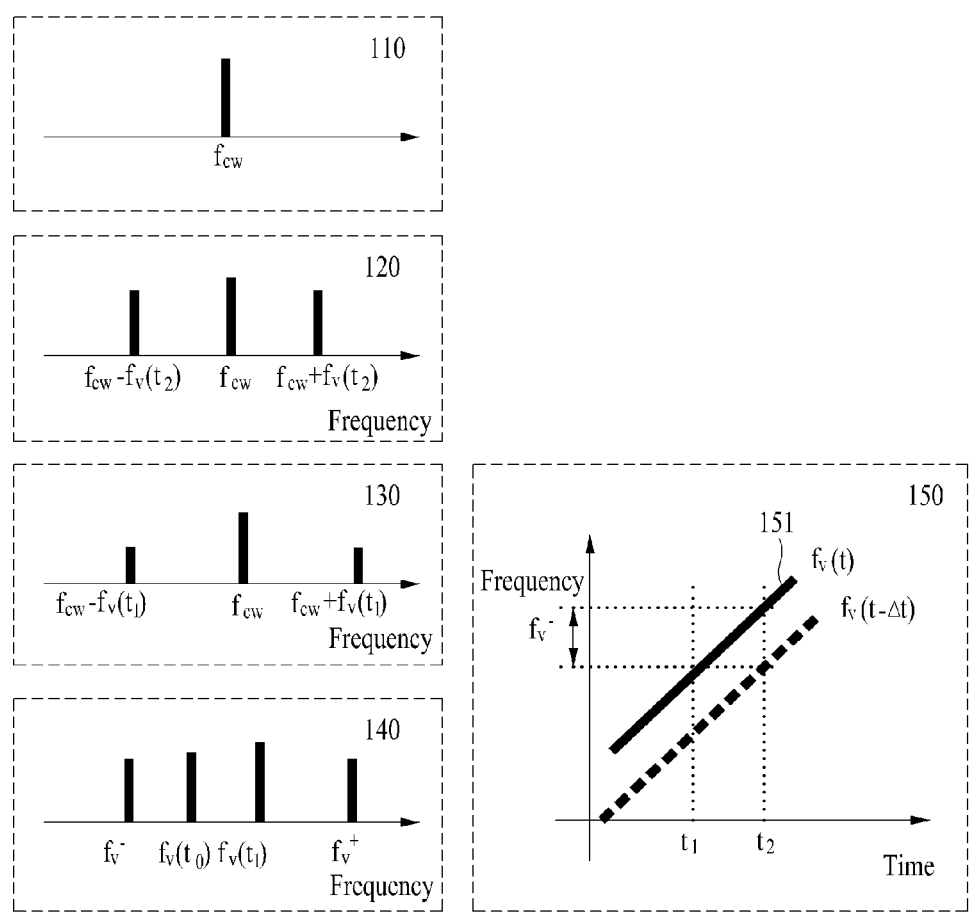
FIG. 2 shows an exemplary diagram for describing a power distribution according to a frequency of a signal and a behavior over time.

FIG. 2 shows an exemplary diagram for describing a power distribution according to a frequency of a signal and a behavior over time, and reference numerals 110 to 140 shown in FIG. 2 may refer to reference numerals 110 to 140 shown in FIG. 1. The principle of the distance measurement method by quasi-frequency modulation will be described with reference to FIG. 2 as follows. For convenience of description, the delay time is not considered except for a time required for signal transfer in free space. The electric field of the optical signal 110 transferred from the optical coupler of FIG. 1 may be expressed as Equation 1 below.

$$Ae^{i(2\pi f_{cw})t} \qquad \text{[Equation 1]}$$

Here, "A" represents the magnitude of the electric field, few represents the oscillation frequency of an optical signal, and "t" represents a time. When <Equation 1> is expressed in the frequency domain, <Equation 1> may be the same as 110 of FIG. 1.

The optical signal having the oscillation frequency few transferred from a light source may be modulated through the optical modulator 103 and then transferred through the optical splitter 104 to the optical coupler 107, the optical signal being expressed as the following Equation 2.

$$(1 + B\cos(2\pi f_v(\tau)t)) = \qquad \text{[Equation 2]}$$
$$Ae^{i(2\pi f_{cw})t} Ae^{i(2\pi f_{cw})t} + \frac{AB}{2}\left(e^{i(2\pi(f_{cw}-f_v(\tau)))t} + e^{-i(2\pi(f_{cw}-f_v(\tau)))t}\right)$$

Here, $(1+B\cos(2\pi f_v(\tau)t))$ is an electrical signal supplied to the optical modulator 103, and has a modulation frequency of $f_v(\tau)$ making a quasi-frequency. The modulation frequency $f_v(\tau)$ may have a characteristic that varies at a certain rate with time ($\tau$). To refer to a frequency component of the modulated optical signal as in Equation 2, the cosine function is replaced with an exponential function. When the modulation frequency varies with time as 151 shown in 150 of FIG. 2, the frequency component of the optical signal 120 transferred from the optical splitter 104 to the optical coupler 107, observed at the second time point t2 includes $f_{cw}-f_v(t_2)$, $f_{cw}$, $f_{cw}+f_v(t_2)$ as shown in 120 of FIG. 2. As described above, a method of modulating the quasi-frequency ($f_{cw}-f_v(t_2)$, $f_{cw}+f_v(t_2)$) is called a quasi-frequency modulation method to distinguish it from a method of modulating the optical carrier frequency ($f_{cw}$) included in the optical signal. The optical signal 130 transferred from the Rx optical phased array 106 to the optical coupler 107 at the second time point t2 may have a modulation frequency $f_v(t_1)$ at a first time point before time, due to the delay time $\Delta t$ caused when the optical signal is emitted and reflected on an object in free space and have a frequency component including $f_{cw}-f_v(t_1)$, $f_{cw}$, $f_{cw}+f_v(t_1)$ as shown in 130 of FIG. 2. 152 of FIG. 2 indicates the behavior of the modulation frequency according to time to which 151 observed in graph 130 has moved by $\Delta t$ on the time axis, including the delay time $\Delta t$ caused when the optical signal is emitted and reflected on the object.

When the optical signals having frequency components in graphs 120 and 130 are mixed by the optical coupler 107 and converted into electrical signals by the balanced photodetector 108, as shown in graph 140 of FIG. 2, an electrical signal with frequency components of $f_v^-(=f_v(t_1)-f_v(t_2))$, $f_v(t_1)$, $f_v(t_2)$, and $f_v^+(=f_v(t_1)+f_v(t_2))$ may be produced. The $f_v^-$ is a signal generated according to the principle in which an electrical signal is generated in proportion to the received optical power when the optical signal is converted into an electrical signal in the balanced photodetector 108, as a beat frequency (or intermediate frequency) that is the difference between the two input frequencies $f_v(t_1)$ and $f_v(t_2)$. As observed in the graph 150, the beat frequency ($f_v^-$) is constant regardless of time, and when the generated beat frequency ($f_v^-$) is measured, it is possible to measure the delay time $\Delta t$ caused when the optical signal is reflected on the object and transmitted and calculate and obtain a distance.

Figure 4:
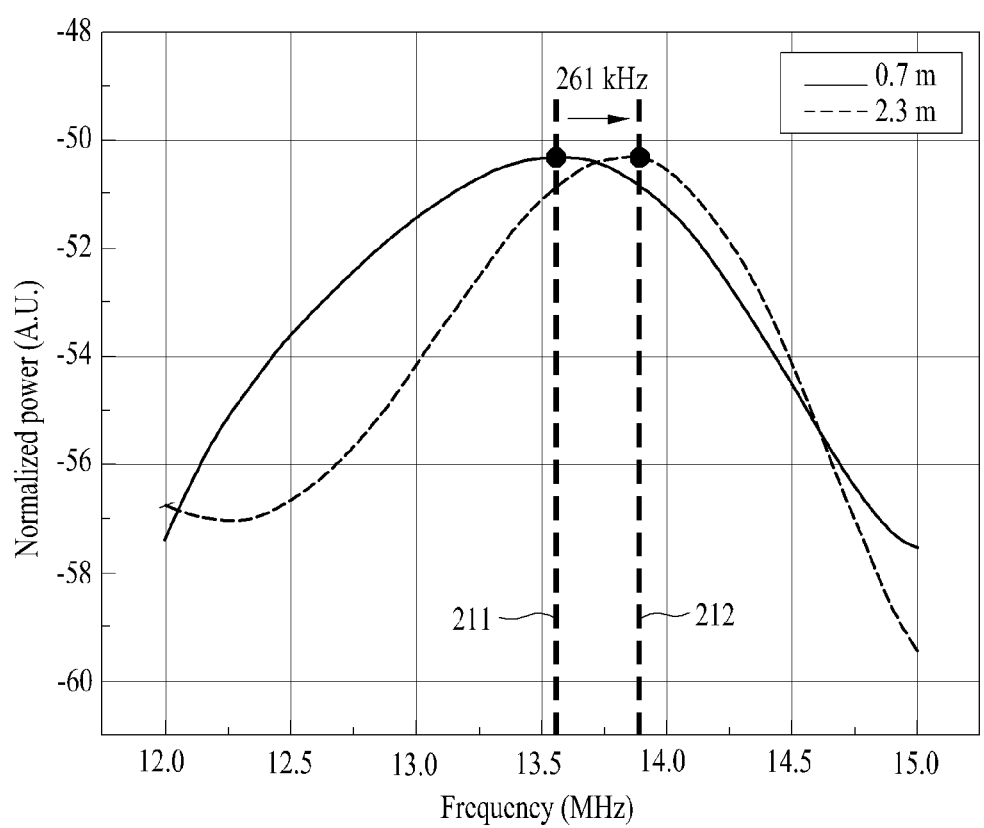
FIG. 4 is an exemplary diagram showing a result of measurement of a distance using a LiDAR device of the inventive concept.

FIG. 4 shows an exemplary view of the result of measuring a distance using a LiDAR device of the inventive concept, and shows the result of measuring a distance by a quasi-frequency modulation method using a silicon optical integrated element.

An object was placed at distances of 0.7 m and 2.3 m, and the frequency responses measured at the distances was measured. The change rate ($\alpha$) of a modulation frequency used was 51.2 THz/s. In addition, for convenience of measurement, an optical fiber is inserted and measurement is performed while the beat frequency ($f_v^-$) is being properly changed.

As can be seen through FIG. 4, it can be confirmed that the beat frequency ($f_v^-$) increases as the distance increases, and the measurement is performed at 13.6 Mhz and 1.38 Mhz, including the delay caused by the inserted optical fiber.

To exclude the delay caused by the optical fiber and elements commonly included in the case of measurement and to identify precise distance information, a distance between the two objects may be calculated using the difference ($\Delta f_v^-$) between a first beat frequency 211 and a second beat frequency 212. The relationship between the measured beat frequency difference ($\Delta f_v^-$) and the distance may be as shown in <Equation 3>.

$$\frac{\Delta f_v^- c}{\alpha} \qquad \text{[Equation 3]}$$

Here, "c" represents the speed of light in the air, and measured $\Delta f_v^-$ may represents 261 khz. According to <Equation 3>, distance information of 1.53 m may be obtained. This is a value very close to the actual value of 1.6 m, and an error of about 5% may be confirmed.

As described above, the LiDAR device according to the embodiment of the inventive concept may measure distance information using quasi-frequency modulation resulted by improving the FMCW method based on a silicon optical phased array. Specifically, it is possible to generate an amplified electrical signal having an intermediate frequency by mixing an optical signal received by being reflected by an object with a coherent reference optical signal having large power and performing beating, and measure a distance to an object based on the generated electrical signal.

In addition, the LiDAR device according to the exemplary embodiment of the inventive concept does not directly modify the optical oscillator of a light source that generates an optical signal of hundreds of THz that is sensitive to an operating environment, and accomplish stable operation with respect to temperature, power, wavelength, and the like by using an external optical modulator operating at hundreds of Mhz without an oscillation structure.

In addition, the LiDAR device according to the exemplary embodiment of the inventive concept may solve limitation in the measurement distance by power by using amplification by coherence without using an FMCW that directly modulates the frequency of the optical signal.

In addition, the LiDAR device according to the exemplary embodiment of the present inventive concept may greatly expand the application field of an optical integrated element-based LiDAR including a silicon optical phased array by solving the limitation in the transmission power.

In addition, the LiDAR device according to the exemplary embodiment of the present inventive concept may implement an efficient system configuration by implementing an external optical modulator for quasi-frequency modulation together in an optical integrated element including an optical phased array.

In addition, in the LiDAR device according to the exemplary embodiment of the present inventive concept, the core modules of light transmission, light steering, and light reception may be composed of a single silicon optical integrated element, which is advantageous for high integration, high reliability, ultra-small size, low cost, low power, and mass production, thus greatly improving its competitiveness.

The LiDAR device described above may perform a distance measurement method composed of the following steps through the above-described structure.

Step 1: generating an optical signal using a light source

Step 2: generating a first optical signal having a quasi-frequency whose a modulation frequency constantly varies with time by modulating a light intensity of the optical signal Step 3: splitting optical power of the first optical signal into a reference optical signal and a transmit (Tx) optical signal Step 4: Emitting the Tx optical signal toward an object Step 5: Receiving a receive (Rx) optical signal that is an optical signal reflected from the object, and mixing the reference optical signal and the Rx optical signal Step 6: detecting an intermediate frequency from the mixed optical signal Step 7: obtaining distance information by measuring the intermediate frequency The detailed operation in each step may include the above description of the structure of the LiDAR device and the functions of each component.

The apparatus described herein may be implemented with hardware components and software components and/or a combination of the hardware components and the software components. For example, the apparatus and components described in the exemplary embodiments may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such a parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the present invention, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other exemplary embodiments, and equivalents to the claims are within the scope of the following claims.

According to the exemplary embodiments of the inventive concept, it is possible to measure distance information using quasi-frequency modulation which is resulted by improving the FMCW method based on a silicon optical phased array. Specifically, it is possible to generate an amplified electrical signal having an intermediate frequency by mixing an optical signal received by being reflected by an object with a coherent reference optical signal having large power and performing beating, and measure a distance to an object based on the generated electrical signal.

According to the exemplary embodiments of the inventive concept, it is possible to accomplish stable operation with respect to temperature, power, wavelength, and the like by using an external optical modulator operating at hundreds of Mhz without an oscillation structure without directly modifying the optical oscillator of a light source that generates an optical signal of hundreds of THz that is sensitive to an operating environment.

According to the exemplary embodiments of the inventive concept, it is possible to solve limitation in the measurement distance by power by using amplification by coherence without using an FMCW that directly modulates the frequency of the optical signal.

According to the embodiments of the inventive concept, it is possible to greatly expand the application field of an optical integrated device-based LiDAR including a silicon optical phased array by solving the limitation in the transmission power.

According to the exemplary embodiments of the inventive concept, it is possible to implement an external optical modulator for quasi-frequency modulation together in an optical integrated element including an optical phased array, thus achieving efficient system configuration.

According to the exemplary embodiments of the inventive concept, it is possible to implement core modules of light transmission, light steering, and light reception with a single silicon optical integrated element, which is advantageous for high integration, high reliability, ultra-small size, low cost, low power, and mass production, thus greatly improving its competitiveness.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A LiDAR device comprising: a light source configured to generate an optical signal;
   an optical modulator configured to generate a first optical signal having a quasi-frequency whose a modulation frequency constantly varies with time by modulating a light intensity of the optical signal;
   an optical splitter configured to split optical power of the first optical signal into a reference optical signal and a transmit (Tx) optical signal an optical transmitter configured to receive and emit the Tx optical signal toward an object;

an optical receiver configured to receive a receive (Rx) optical signal reflected from the object and transfer the Rx optical signal;

an optical coupler configured to mix the reference optical signal and the Rx optical signal;

a balanced photodetector configured to detect an intermediate frequency from the optical signal transferred from the optical coupler; and a distance calculator configured to obtain distance information by measuring the intermediate frequency, wherein the optical modulator has a Y-branch structure and includes a mach zehnder interferometer (MZI) based structure having a phase shifter of a silicon p-n junction structure on the Y-branch structure.

2. The LiDAR device of claim 1, wherein the optical transmitter and the optical receiver are an optical transmitter and an optical receiver which are based on an optical phased array.

3. The LiDAR device of claim 2, wherein the optical transmitter includes N arrays arranged in one of a lattice structure, a mirror structure, or a metal thin film structure.

4. The LiDAR device of claim 2, wherein the optical receiver includes N arrays arranged in one of a lattice structure, a mirror structure, or a metal thin film structure.

5. The LiDAR device of claim 1, wherein the optical coupler includes an optical coupler in which the reference optical signal and the Rx optical signal inputted to two waveguides are mixed, subjected to phase shift, and transferred to an output port.

6. The LiDAR device of claim 1, wherein the balanced photodetector is implemented as a silicon photon assisted tunneling photodetector (Si PAT-PD) in form of an optical waveguide photodetector that obtains a photocurrent using a photon assisted tunneling effect by a reverse bias voltage applied to a p-n junction structure of a silicon waveguide.

7. The LiDAR device of claim 1, wherein the optical modulator, the optical splitter, the optical transmitter, the optical receiver, the optical coupler and the balanced photodetector are integrated in a single silicon optical chip.

8. A LiDAR device comprising:

a light source configured to generate an optical signal;

an optical modulator configured to generate a first optical signal having a quasi-frequency whose a modulation frequency constantly varies with time by modulating a light intensity of the optical signal;

an optical splitter configured to split optical power of the first optical signal into a reference optical signal and a transmit (Tx) optical signal an optical transmitter configured to receive and emit the Tx optical signal toward an object;

an optical receiver configured to receive a receive (Rx) optical signal reflected from the object and transfer the Rx optical signal;

an optical coupler configured to mix the reference optical signal and the Rx optical signal;

a balanced photodetector configured to detect an intermediate frequency from the optical signal transferred from the optical coupler; and a distance calculator configured to obtain distance information by measuring the intermediate frequency, wherein the optical splitter includes a multimode interference optical splitter having a predetermined splitting ratio, which forms a multimode interference pattern according to a self-imaging theory by coupling the first optical signal, which has been transferred through a single mode optical waveguide, to a multimode optical waveguide and placing an output waveguide in a region in which the multimode interference pattern is generated.

9. A LiDAR device comprising:

a light source configured to generate an optical signal;

an optical modulator configured to generate a first optical signal having a quasi-frequency whose a modulation frequency constantly varies with time by modulating a light intensity of the optical signal;

an optical splitter configured to split optical power of the first optical signal into a reference optical signal and a transmit (Tx) optical signal an optical transmitter configured to receive and emit the Tx optical signal toward an object;

an optical receiver configured to receive a receive (Rx) optical signal reflected from the object and transfer the Rx optical signal;

an optical coupler configured to mix the reference optical signal and the Rx optical signal;

a balanced photodetector configured to detect an intermediate frequency from the optical signal transferred from the optical coupler; and a distance calculator configured to obtain distance information by measuring the intermediate frequency, wherein the optical transmitter and the optical receiver are an optical transmitter and an optical receiver which are based on an optical phased array, wherein the optical transmitter includes a means capable of emitting the Tx optical signal transferred onto an optical waveguide to free space through a plurality of optical radiators and simultaneously adjusting an emission direction by adjusting a phase difference of a beam emitted from each optical radiator.

10. A LiDAR device comprising:

a light source configured to generate an optical signal;

an optical modulator configured to generate a first optical signal having a quasi-frequency whose a modulation frequency constantly varies with time by modulating a light intensity of the optical signal;

an optical splitter configured to split optical power of the first optical signal into a reference optical signal and a transmit (Tx) optical signal an optical transmitter configured to receive and emit the Tx optical signal toward an object;

an optical receiver configured to receive a receive (Rx) optical signal reflected from the object and transfer the Rx optical signal;

an optical coupler configured to mix the reference optical signal and the Rx optical signal;

a balanced photodetector configured to detect an intermediate frequency from the optical signal transferred from the optical coupler; and a distance calculator configured to obtain distance information by measuring the intermediate frequency, wherein the optical transmitter and the optical receiver are an optical transmitter and an optical receiver which are based on an optical phased array, wherein the optical transmitter includes optical reception arrays made of N arrays, and wherein the optical reception arrays receives an optical signal received in a direction corresponding to a specific phase difference by applying the specific phase difference to an optical signal received in each channel through a phase shifter provided from each channel.

* * * * *